United States Patent [19]
Nitta et al.

[11] Patent Number: 4,890,251
[45] Date of Patent: Dec. 26, 1989

[54] ARITHMETIC SHIFTER WITH SIGN EXTEND FACILITY

[75] Inventors: Yasuhiko Nitta; Kazuo Nakamura, both of Hyogo, Japan

[73] Assignee: Mitsubishi Denki Kabushiki Kaisha, Japan

[21] Appl. No.: 159,869

[22] Filed: Feb. 24, 1988

[30] Foreign Application Priority Data

Jun. 30, 1987 [JP] Japan .................................. 62-164331

[51] Int. Cl.$^4$ .............................................. G06F 7/38
[52] U.S. Cl. .................................................. 364/715.08
[58] Field of Search ................... 364/715.08, 200, 900, 364/736

[56] References Cited

U.S. PATENT DOCUMENTS 4,396,994 8/1983 Kang et al. ...................... 364/715.08
4,583,197 4/1986 Chappell et al. ................ 364/715.08

FOREIGN PATENT DOCUMENTS 54-251333 2/1979 Japan ............................... 364/715.08

OTHER PUBLICATIONS

C. Mead et al., "Introduction to VLSI systems", Oct. 1980, pp. 157-162.

Primary Examiner—Emanual S. Kemeny
Assistant Examiner—Long T. Nguyen
Attorney, Agent, or Firm—Townsend and Townsend

[57] ABSTRACT

A shifter for shifting a first data word by a bit width which is specified by a second data word. The shifter provides a sign extension so that the shifter can be used for arithmetic shifts. The shifter includes a first inverter for inverting the bits of the first data word only when the most significant bit of the data word is a predetermined datum. The output from the inverter is shifted, using a shifter array, by a bit width specified by the second data word. The output from the shifter array is provided to a second inverter. The second inverter inverts the output from the shifter array only if the most significant bit of the first data word is a predetermined datum.

6 Claims, 3 Drawing Sheets

ARITHMETIC SHIFTER WITH SIGN EXTEND FACILITY

BACKGROUND OF THE INVENTION

The present invention relates generally to shifters and, more particularly, to a shifter for performing an arithmetic right shift operation based on shift data.

FIGS. 5 and 6 show a conventional shifter. A shifter array 5 moves data to the right by a bit width specified by shift data. As shown in FIG. 6, the shifter array 5 receives data (to be shifted) at its inputs D5–D0 and shift data at its inputs SF5–SF0 and outputs shifted data at its outputs SD5–SD0. The shifter array 5 includes six groups of six N-channel MOS transistors 600–605, 610–615, 620–625, 630–635, 640–645, and 650–655, which operate as transmission gates.

Individual gates of the transistors 600–605, 610–615, 620–625, 630–635, 640–645, and 650–655 are connected to the inputs SF0, SF1, SF2, SF3, SF4, and SF5, respectively. Individual sources of the transistors 600, 610, 620, 630, 640, and 650; 601, 611, 621, 631, 641, and 651; 602, 612, 622, 632, 642, and 652; and 603, 613, 623, 633, 643, and 653; and 604, 614, 624, 634, 644, and 654; and 605, 615, 625, 635, 645, and 655 are connected to the outputs SD0, SD1, SD2, SD3, SD4, and SD5, respectively. Individual drain of the transistor 600 is connected to the input D0. Individual drains of the transistors 601, and 610 are connected to the input D1. Individual drains of the transistors 602, 611, and 620 are connected to the input D2. Individual drains of the transistors 603, 612, 621, and 630 are connected to the input D3. Individual drains of the transistors 604, 613, 622, 631, and 640 are connected to the input D4. Individual drains of the transistors 605–655, 614–654, 623–653, 632–652, 641–651, and 650 are connected to the input D5.

In operation, by bringing a bit of shift data SFi (i=5–0) to a high level "H", data applied to the inputs D5–D0 is shifted to the right by i bits and presented at the outputs SD3–SD0. Where the data applied to the inputs D5–D0 is arithmetic data, the i bit right shift operation requires a sign extend facility for the bit positions higher than the SFi bit position.

As shown in FIG. 6, transistors 615, 624–625, 633–635, 642–645, and 651–655 enclosed by a dashed line are provided to constitute a sign extend facility. That is to say, suppose that data "101000" is applied to the inputs D5–D0, the most significant bit (MSB) of the data is "1" indicating that the data is a negative number. When shift data "000100" is applied to the inputs SF5–SF0, 2-bit right shifted data "001010" is obtained unless the transistors enclosed by the dashed line are provided. The MSB of the shifted data is "0" indicating that the result is positive. With the transistors enclosed by the dashed line, however, the shifted data is "111010" and the MSB is "1" indicating that the result is negative. Thus, to propagate the MSB of data for performing an arithmetic right shift operation, the conventional shifter of FIG. 6 requires a sign extend facility, resulting in the increased number of transistors in the shifter array.

SUMMARY OF THE INVENTION

Accordingly, it is an object of the invention to provide a shifter for performing an arithmetic right shift operation with fewer transistors than those of the conventional shifter.

According to the invention, the above object may be achieved by a shifter for shifting first data by a bit width specified by second data, which includes a first inverter for inverting respective bits of the first data to provide third data only if the most significant bit of the first data is a predetermined data; a shifter array for shifting the third data by a bit width specified by the second data to provide fourth data; and a second inverter for inverting respective bits of the fourth data only if the most significant bit is the predetermined data.

Other objects, features, and advantages of the invention will be apparent from the following description when taken in conjunction with the accompanying drawings.

DESCRIPTION OF THE PREFERRED EMBODIMENTS

Figure 1:
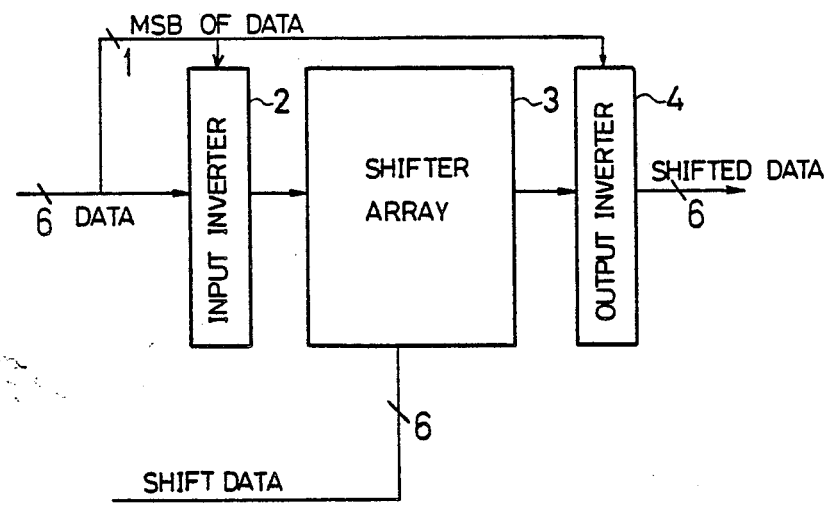
FIG. 1 is a block diagram of a shifter according to an embodiment of the invention.
Figure 5:
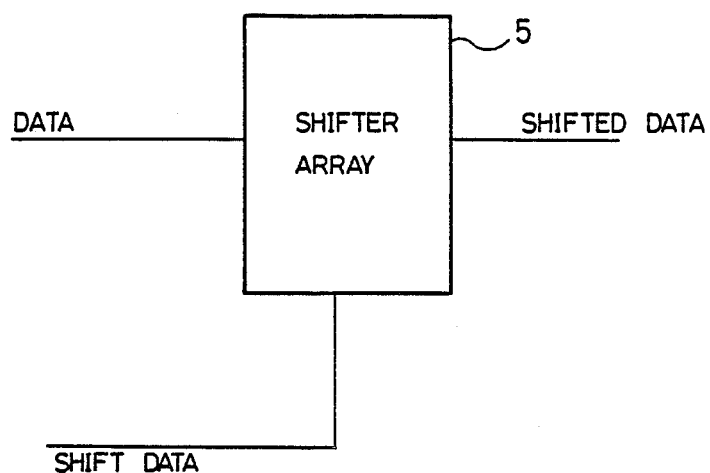
FIG. 5 is a block diagram of a conventional shifter.

In FIG. 1, an input inverter 2 and an output inverter 4 are provided at the input and the output of a shifter array 3, respectively. The input inverter 2 inverts respective bits of data according to the contents of the MSB of the data and inputs the inverted data to the shift array 3. The shift array 3 receives shift data in the same manner as the conventional shifter of FIG. 5. The output inverter 4 receives and inverts the shifted data according to the contents of the MSB of the data and outputs the inverted shifted data.

Figure 2:
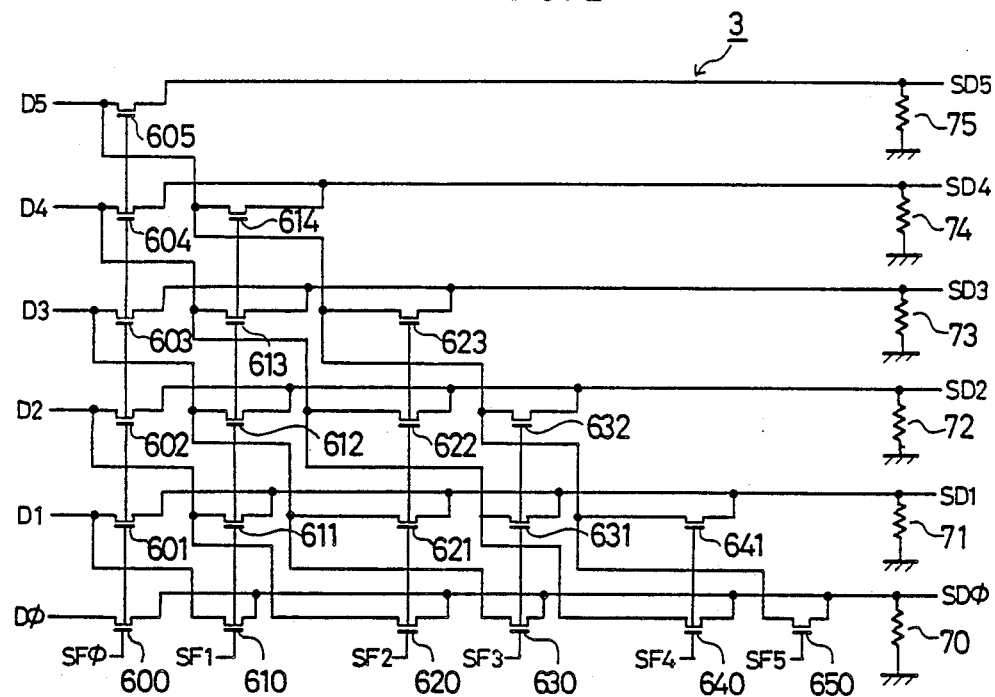
FIG. 2 is a schematic diagram of the shifter array of FIG. 1.
Figure 6:
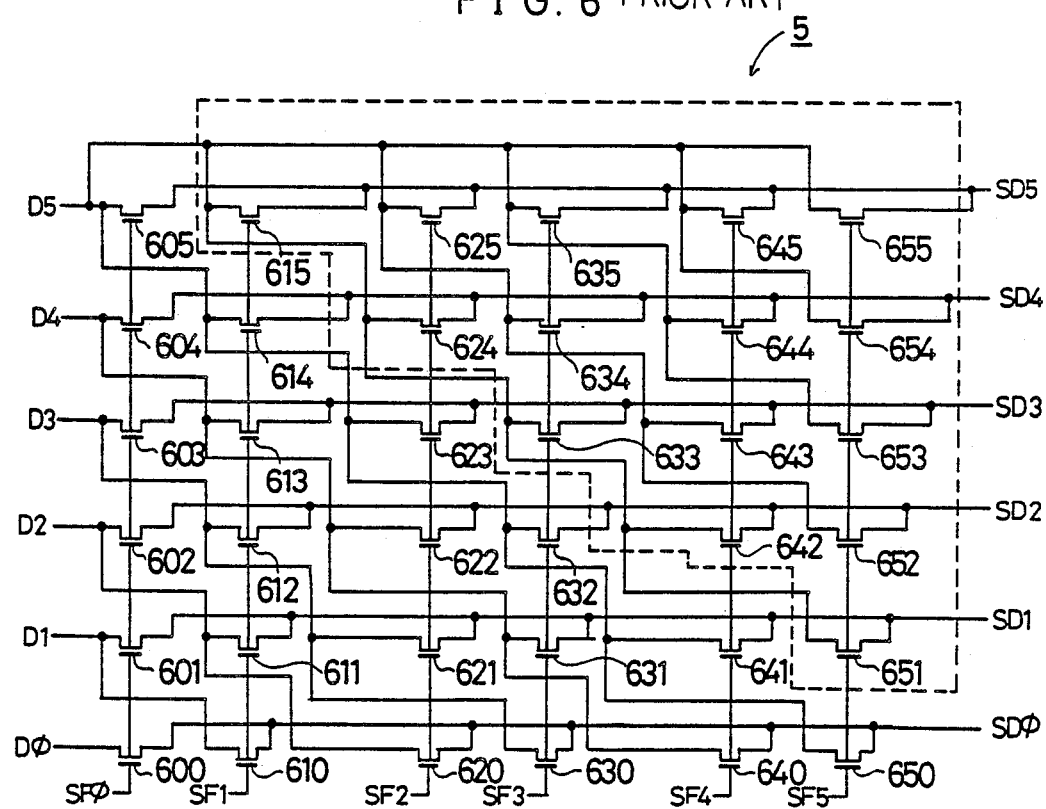
FIG. 6 is a schematic diagram of the shifter array of FIG. 5.

As shown in FIG. 2, the shifter array 3 is identical with that of FIG. 6 except that the transistors enclosed by the dashed line are eliminated and that six pull down resistors 70–75 are connected to the six outputs SD0–SD5, respectively.

Figure 3:
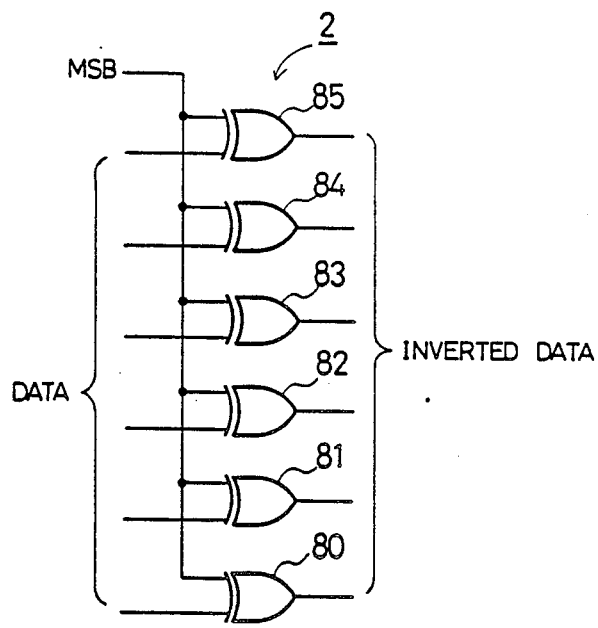
FIG. 3 is a schematic diagram of the input inverter of FIG. 1.

As shown in FIG. 3, the input inverter 2 includes six EXOR gates 80–85 each receiving the MSB of data at one input and the data at the other input. Individual outputs of the EXOR gates 85–80 are connected to the inputs D5–D0 of the shifter array of FIG. 2.

Figure 4:
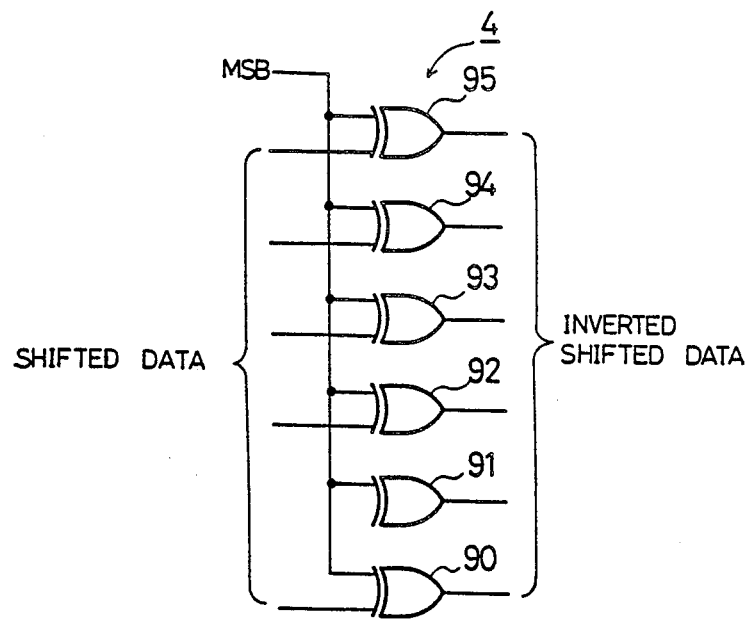
FIG. 4 is a schematic diagram of the output inverter of FIG. 1.

As shown in FIG. 4, the output inverter 4 includes six EXOR gates 90–95 each receiving at one input the MSB of data and at the other input each bit of the shifted data from the outputs SD5–SD0 of the shifter array 3. The EXOR gates 95–90 present shifted data at the respective outputs.

In operation, suppose that shift data and data (to be shifted) are "000100" and "010111", respectively. The MSB of the data is "0" indicating that the data is a positive number. This MSB is fed to one of the inputs of each EXOR gate 85–80 and one of the inputs of each EXOR gate 95–90. The data "010111" is fed to the other input of each EXOR gate 85–80. The input inverter 2 and the output inverter 4 are designed to invert respective bits of the input data when the MSB input is "1" and to output the input data without inverting the respective bits when the MSB input is "0". Since the MSB is "0" in this case, the input data is presented without inversion. That is, the data "010111" is output from the input inverter 2 and applied to the inputs D5–D0 of the shifter array 3. At this point, the shift data "000100" is applied to the inputs SF5–SF0 so that 2-bit right shifted data "000101" is presented at the outputs SD5–SD0. The output inverter 4 outputs the input data without inversion so that the data output at the outputs SD5–SD0 is "000101." This result agrees with what is obtained by shifting the data "010111" by a width of shift specified by the shift data "000100" or 2 bits with the aid of a sign extend facility.

Next, suppose that the shift data and data are "000100" and "101000", respectively. Since the MSB of the data "101000" is "1" indicating that the data is a negative number, the input inverter 2 and the output inverter 4 invert respective bits of the input data. Consequently, the data "010111" inverted by the input inverter 2 is applied to the inputs D5–D0 of the shifter array 3. At this point, the shift data "000100" is applied to the inputs SF5–SF0 so that the data is shifted 2 bits to the right, and "000101" is presented at the outputs SD5–SD0. Since the output inverter 4 inverts the input data, the resulting data is "111010" in which the respective bits of the "000101" output are inverted. This result agrees with what is obtained by shifting the data "101000" to the right by a number of bits specified by the shift data "000100" or 2 bits with the aid of a sign extend facility.

With the above shifter arrangement, an arithmetic right shift operation is carried out along with a sign extend operation. Although the pull down resistors 70–75 are necessary, the transistors enclosed by the dashed line in FIG. 6 may be eliminated in the shifter array of FIG. 2, thus reducing the number of transistors as a whole in the shifter array.

In the above embodiment, the widths of data and shift data are 6 bits, respectively, but, generally, may be n bits, where n is a natural number. The widths of data and shift data may be different. In either case, the same results as above may be obtained.

While a preferred embodiment of the invention has been described using specific terms, such description is for illustrative purposes only, and it is to be understood that changes and variations may be made without departing from the spirit and scope of the invention as recited in the appended claims.

What is claimed is:

1. A shifter for shifting first data by a bit width specified by second data, said shifter comprising:
   first inverter means for inverting respective bits of said first data to provide third data only if the most significant bit of said first data is predetermined data;
   a shifter array for shifting said third data by a bit width specified by said second data to provide fourth data; and
   second inverter means for inverting respective bits of said fourth data only if said most significant bit of said first data is said predetermined data, to provide output data.

2. The shifter of claim 1, wherein said third data has at least a first, higher bit position and a second bit position, and said fourth data has at least a first bit position and a second lower bit position, and wherein said shifter array comprises data input means, shift data input means, data output means, and a plurality of switching element means, connected to said data input means, said shift data input means and said data output means, for sequentially moving data from the higher bit position of said third data to the lower bit position of said fourth data by a bit width specified by said second data.

3. The shifter of claim 1, wherein said first inverter means comprises a plurality of first exclusive OR logic gates each receiving each bit of said first data at one of its inputs and said most significant bit at the other input.

4. The shifter of claim 2 or 3, wherein said second inverter means comprises a plurality of second exclusive OR logic gates each receiving each bit of data output from said shifter array at one of its inputs and said most significant bit at the other input.

5. A shifter, as claimed in claim 2, further comprising at least a first resistor connected to said data output means.

6. A method for shifting a first data word by a bit width specified by a second data word, comprising:
   providing first and second selective inverter means for selectively inverting a data word input to said inverter means;
   providing a shifter array for shifting data input to said shifter array by a bit width specified by said second data;
   inputting said first data word to said first inverter;
   inverting said first data word using said first inverter means only if the most significant bit of said first data word is a predetermined datum, to provide a third data word;
   shifting said third data word using said shifter array by a bit width specified by said second data to provide a fourth data word; and
   inverting said fourth data word using said second selective inverter means when said most significant bit of said first data is said predetermined datum, to provide output data.

* * * * *